(12) United States Patent
Shlimak et al.

(10) Patent No.: US 6,664,708 B2
(45) Date of Patent: Dec. 16, 2003

(54) METHOD AND DEVICE FOR NON-CONTACT DETECTION OF EXTERNAL ELECTRIC OR MAGNETIC FIELDS

(75) Inventors: Issai Shlimak, Tel Aviv (IL); Vladimir Sondomirsky, Ariel (IL); Marik Levin, Rehovot (IL); Anatolii Kozlov, Novosibirsk (RU)

(73) Assignee: Voltage Vision Ltd., Netanya (IL)

( * ) Notice: Subject to any disclaimer, the term of this patent is extended or adjusted under 35 U.S.C. 154(b) by 0 days.

(21) Appl. No.: 09/887,014

(22) Filed: Jun. 25, 2001

(65) Prior Publication Data

US 2002/0130587 A1 Sep. 19, 2002

Related U.S. Application Data

(63) Continuation-in-part of application No. PCT/IL99/00685, filed on Dec. 15, 1999.

(30) Foreign Application Priority Data

Dec. 23, 1998 (IL) .................................................. 127699

(51) Int. Cl.[7] .................................................. H03H 9/25

(52) U.S. Cl. .................................. 310/313 R; 333/158

(58) Field of Search ........................ 310/313 R; 333/158

(56) References Cited

U.S. PATENT DOCUMENTS

| | | | |
|---|---|---|---|
| 4,340,872 A | 7/1982 | Alter | 333/152 |
| 5,469,170 A | 11/1995 | Mariani | 342/51 |
| 5,966,008 A | * 10/1999 | Maier et al. | 324/117 R |
| 6,084,503 A | * 7/2000 | Ruile et al. | 310/313 B |
| 6,278,588 B1 | * 8/2001 | Ruigrok | 360/313 |

FOREIGN PATENT DOCUMENTS

| | | | |
|---|---|---|---|
| DE | 195 14 342 C1 | 4/1995 | G01R/15/20 |
| EP | 0 810 724 A2 | 12/1997 | H03H/9/02 |
| WO | WO 93/13495 | 7/1993 | G06K/7/10 |
| WO | WO 97/09624 A1 | 3/1997 | G01R/15/26 |

OTHER PUBLICATIONS

"Physical Properties Of Crystals" by J. F. Nye; Oxford, At the Claredon Press; 1957 (relevant fragment from this monograph pp. 257–258). 12/57.

R. B. Thompson and C.F. Quate, J. Appl. Phys. 42, 907 (1970) (relevant fragment from this article pp. 911–912). 12/70.

"Spin Waves And Magnetic Excitations", Edited by A. Borovik–Romanov, S.K. Sinha. North Holland. Amsterdam–New York–Tokyo, 1988 (relevant fragment from this monograph pp. ix–xiv). 12/88.

* cited by examiner

Primary Examiner—Thomas M. Dougherty
(74) Attorney, Agent, or Firm—Oliff & Berridge, PLC (57) ABSTRACT

A device for non-contact detection of an external electric or magnetic field is presented. The device comprises an active unit cable of emitting an interrogation signal, and a passive unit to be positioned at a spot where the external field is to be detected. The passive unit comprises a substrate, which is capable of transporting therethrough a wave sensitive to the external field, and is formed with a delay line thereon. The delay line forms a wave channel for the wave's propagation, and is capable of converting the interrogation signal into an output response signal. The wave channel is exposed contactlessly to action of the external field, which effects a change in a velocity of the wave propagation through the wave channel, the response output signal being thereby informative of the external field. The active unit is capable of receiving and processing the output response signal for determining and indicating the external field at the spot.

39 Claims, 6 Drawing Sheets

METHOD AND DEVICE FOR NON-CONTACT DETECTION OF EXTERNAL ELECTRIC OR MAGNETIC FIELDS

This is a Continuation-in-Part of Application No. PCT/IL99/00685 filed Dec. 15, 1999. The entire disclosure of the prior application is hereby incorporated by reference herein in its entirety.

FIELD OF THE INVENTION

This invention relates to a device and method for the contactless detection of external electric and magnetic fields.

BACKGROUND OF THE INVENTION

As is widely known, piezoelectric materials possess the special property of becoming electrically polarized under mechanical pressure. The converse effect is known as well. Such properties have given rise to the development of various piezoelectric sensors and detectors.

The mentioned converse approach enables piezoelectric elements to be utilized for sensing electric voltage applied thereto. In such sensors, the voltage applied to the element results in respective mechanical deformation of the element, which can be registered.

U.S. Pat. No. 4,340,872 describes a controllable piezoelectric crystal delay line. An input signal is transmitted through input lines to an input transducer and an output signal is received through output lines from an output transducer. The input signal is converted to a surface acoustic wave (SAW) propagating along the surface of the piezoelectric crystal. Control electrodes are applied to surfaces of the piezoelectric crystal and are connected to control lines. A control signal (an electric voltage) is applied to the control lines, and thus an electric field applied to the piezoelectric crystal alters its longitudinal dimension and, consequently, controls the propagation distance between the input transducer and the output transducer. By varying the propagation distance between the transducers, the control signal continuously varies the propagation delay of SAW. Thus, the time delay between the input and output signals is a function (i.e., a measure) of the control voltage applied to the driven lines. However, the device of US'872 provides for measuring an electrical field using contacts, i.e., without guarantying desired safety.

EP 810724 describes a tunable piezoelectric delay line comprising a SAW conducting piezoelectric substrate, two transducers and an additional electrode. This device is claimed to be used as a voltage sensor. The delay line is tuned by applying electric voltage to the additional electrode manufactured as a capacitive MOS structure (a semiconductor plate) which is superimposed on the piezoelectric substrate between the transducers of the delay line. The electroconductivity of the semiconductor plate electrode is controlled by the electric field effect. Since the SAW velocity depends on the electroconductivity of the adjacent electrode, the application of voltage to the MOS structure controls the delay time of the delay line. The structure described in EP 810724 is quite complex to prepare and, besides that, has low sensitivity to the applied electrical voltage. Another drawback of the device is its inapplicability to cases where non-contact detection of electric field or voltage is required, since in the device, the voltage of interest has to be applied to the semiconductor plate via electrical contacts.

Technique aimed at measuring external fields are also disclosed in the following publications: DE 19514342, WO 97/09624, and WO 93/13495.

According to the technique disclosed in DE 19514342, a current transformer assembly is used for determining voltage by measuring an electric current flowing in a high-voltage power line (electrical wire). However, for example, in the case of line disruption, this technique does not allow to determine the presence of a high voltage unambiguously.

According to WO 97/09624, a voltmeter utilizing an impedance voltage divider is used, being inserted between an electrical conductor whose electrical potential is to be measured relative to an electrical base potential, and this base potential. A surface-wave device is used as a part of the voltmeter, and has the function of measuring an electric voltage occurring across the voltage divider, namely, a voltage whose electric field has a valuable effect on the wave propagation in the surface-wave device. This technique, however, is not a contactless one.

WO 93/13495 discloses the use of a passive surface-wave sensor that can be wirelessly interrogated and used for measuring an external temperature field. The description of this technique focuses on the kinds of interrogation signals and a code used in an acoustic line, presenting no specific construction of a measuring device suitable to be used with this technique. The interrogation signals are frequency-modulated, and the acoustic line is chirped-coded and located in a particular place, where some external temperature field is to be fixed or measured.

Thus, practically, no solution has been found so far in the relevant prior art for the non-contact detection of electric fields or voltages, i.e., for safe measurement. This problem prevents performing a quick and safe test to determine whether a required voltage exists between electric wires in a power supply line, or in other hard-to-reach points.

Another modification of a delay line, such as a so-called resonator delay line is also known in the art. It comprises a transducer placed on a substrate and two systems of reflectors disposed bilaterally of the transducer.

U.S. Pat. No. 5,469,170 describes a system of passive SAW-identification tags to be placed on a plurality of articles, wherein the tags operate with the aid of a chirp transducer. The passive SAW-ID tag device is provided with a piezoelectric substrate having bus bars, spaced electrode taps between the bus bars and a built-in antenna, connected with an input SAW transducer matched to an input chirp signal generated by a nearby located chirp transmitter (an interrogating transmitter). The SAW-ID tags are intended for identifying articles and do not perform any additional function.

SUMMARY OF THE INVENTION

The main idea of the present invention consists of utilizing an effect, other than the converse piezoelectric effect. The converse piezoelectric effect is the linear effect consisting of the mechanical deformation of a piezoelectric element caused by an external electrical field to which the element is exposed. The effect utilized in the present invention is a non-linear effect and consists of a change in the velocity of propagation of a wave in a substrate capable of transporting the wave therethrough, wherein said change is caused by the application of an external electric or magnetic field. This physical effect, the so-called electroacoustic effect, is described, for example, in the following publications: *"Physical properties of crystals"*, J. F. Nye, Oxford, At the Clarendon Press, 1957; and R. B. Thompson and C. F. Quata, J. Appl. Phys. 42, 907 (1970).

Magneto-static and magneto-elastic waves can be created in magnetic materials (such as ferrites) when a micro-strip transducer mounted on a surface thereof is excited by an electromagnetic signal. Delay lines, functionally analogous to those known with respect to piezoelectric substrates, are described also for the magnetic materials. Moreover, the wave propagation characteristics, such as phase and group velocities and attenuation, depend on an external magnetic field to which the materials are exposed. The above properties are described, for example, in a monograph *"Spin waves and magnetic excitations"*. Edited by A. Borovik-Romanov, S. K. Sinha. North Holland. Amsterdam-New-York-Tokyo, 1988.

The present invention is particularly useful for the non-contact detection of the existence of an external electric or magnetic field in the vicinity of a high-voltage electric line. It should be understood that if the external field to be detected is an electric field, a piezoelectric or electrostriction substrate is used and said wave is an acoustic wave. If the external field to be detected is a magnetic field, the substrate is made of a magnetic material and said wave is a magnetic wave. The term "magnetic wave" used herein signifies a magneto-static or magneto-elastic wave in magnetic materials.

The inventors have found that when dealing with the detection of an external electric or magnetic field, the above-indicated non-linear effect of the change in the velocity of wave propagation is much stronger than the linear effect of mechanical deformation of a piezoelectric crystal. The sensitivity of the sensor device is thus significantly increased.

It is therefore an object of the invention to provide a method and a device suitable for non-contact and, optionally, also the remote detection of external magnetic and/or electric fields and voltages, utilizing the effect of the wave velocity change caused by the application of such external field.

Another object of the invention is to provide a sensor with high sensitivity for use in the above device, which is capable of measuring electric and magnetic fields over a wide range of intensities.

Still a further object of the invention is to provide a system for the remote contactless detection of external fields in hard-to-reach spots, for example around any selected electric wire or at any string insulator unit of an electric power line, at inaccessible contacts in switchboards, etc.

Besides the above, a method of utilizing the inventive system for tracing malfunctions in electric power lines forms yet an additional aspect of the present invention.

The term "external field" used herein below with reference to the inventive device and method should be understood as meaning at least one component from the following list: an alternating electric field, an alternating magnetic field, a static electric field and a static magnetic field.

According to one aspect of the invention, there is provided a sensor for use in a device for non-contact detection of an external field by positioning the sensor at a spot where the external field is to be detected, the sensor comprising a delay line, which is to be exposed contactlessly to action of the external field and comprises:

a transducer arrangement that is provided on a substrate made of a material capable of transporting therethrough a wave sensitive to said external field, and defines a wave channel for the wave propagation through the substrate, the transducer arrangement being capable of being actuated by an interrogation signal to generate said wave propagating through the wave channel and capable of converting the wave into an output response signal, said external field affecting a change in a velocity of the wave propagation, said output response signal being thereby informative of said external field.

According to another aspect of the present invention, there is provided a device for non-contact detection of an external field, comprising:

active and passive units, wherein the passive unit is to be positioned at a spot where the external field is to be detected, and the active unit is operable to emit an interrogation signal to be received at the passive unit, receive an output response signal coming from the passive unit, and process said output response signal for determining and indicating the external field, the passive unit comprising:

a substrate made of a material capable of transporting therethrough a wave sensitive to said external field, and a delay line provided on said substrate to define a wave channel for the wave propagation through the substrate, the delay line comprising a transducer arrangement capable of being actuated by said interrogation signal to generate said wave propagating through the wave channel and capable of converting the wave into said output response signal, said wave channel being exposed contactlessly to action of the external field, which effects a change in a velocity of the wave propagation, said output response signal produced by the passive unit being thereby informative of said external field.

In accordance with the first basic embodiment of the device, it is intended for detecting external electric fields. Therefore, in the above definition, said external field to be detected is an electric field; said substrate is made of a piezoelectric material or electrostriction material (e.g., $BaTiO_3$), and said wave is an acoustic wave (in our case a surface acoustic wave—SAW).

The second basic embodiment of the device is intended for detecting magnetic external fields, and the device comprises the substrate of a magnetic material (such as Yttrium Iron Garnet or other ferrite with low magnetic losses) capable of transporting a magnetic wave, if appropriately excited.

The transducer arrangement can be composed of a pair of transducers placed on a surface of said substrate and forming therebetween a wave channel. The pair of transducers is capable of launching said wave in the wave channel whenever the electromagnetic interrogation signal is received, and converting the wave into an electromagnetic response signal.

The delay line of the above-mentioned type can be formed in both basic embodiments of the device, i.e., on the piezoelectric or electrostriction substrate and on the ferrite substrate. The selection of transducers for these two embodiments are to be provided whilst considering the specific features of the respective substrates. For example, in the piezoelectric-based embodiment of the device, one transducer of the mentioned pair of the transducers in the passive unit serves to launch SAW in response to the interrogation signal. The acoustic channel, being contactlessly exposed to and directly controllable by the external electric field, changes the velocity of propagation of SAW therethrough with the intensity of said field. The output transducer of the pair derives a delayed signal in response to the launched SAW, and change in the response signal's delay will be informative of the intensity of the external electric field. Analogous processes take place in the second basic embodiment, where a magnetic material is used for the propagation of magnetic waves.

In the piezoelectric basic embodiment, said delay line may be easily implemented by a so-called resonator delay line, which is characterized by relatively small dimensions at a relatively high total delay time. The resonator delay line can be formed by one transducer placed on a surface of the substrate between a pair of reflectors, which define the wave channel being an acoustic resonator. Each of the reflectors may constitute, for example, a system of parallel grooves, lugs, metal strips, etc. provided on the surface of the piezoelectric substrate. Such reflectors cause the SAW, whenever launched by the transducer in the acoustic resonator, to be successively reflected, thereby producing on the transducer a considerable resonance response signal at a certain resonance frequency value of the delay line. Since the wave channel is subjected to the direct action of the external field, any change in the external electric field will affect the velocity of propagation of the SAW between the reflectors (i.e., the time of propagation or phase shift). To achieve a resonance condition in the wave channel, the double time of run between both reflectors should be an integer number of time periods of the carrier frequency of a signal. Hence, the change of SAW velocity will cause a shift (change) of the resonance frequency from said certain value. The shift of the resonance frequency is thus informative of the intensity of the external electric field.

According to a preferred embodiment, said active unit may comprise a signal source capable of transmitting the interrogation signal, a receiver capable of receiving the response signal from said passive unit, and processing means capable of determining the external field by processing the response signal and the reference signal for further indicating the determined field.

For the embodiments where the delay line comprises two transducers, the processing means are to be adapted to process the phase shift between the response signal and the reference signal. In the embodiment with the resonator delay line, the processing means are to be adapted to detect and process the detected shift of the resonance frequency from said certain resonance frequency value.

Owing to the non-contact exposure of the passive unit of the device to the field to be detected, the present invention enables measurements to be carried out safely. It goes without saying that the safety of remote measurement as opposed to just non-contact one is higher.

According to the most preferred embodiment of the device, said active unit can be positioned remotely from the passive unit; both the active and passive units are provided with respective emitting-receiving antennas, and said signal source of the active unit constitutes a transmitter, thus enabling safe non-contact and remote detection of external fields.

To this end, a method of contactless (and optionally, remote) detection of electric fields (or voltages) includes mounting the passive unit at a spot where the electric field is to be detected, and activating the active unit of said device to obtain indication of the electric field at said spot.

Another important aspect of the invention is to provide a highly sensitive sensor suitable for use as the passive unit of the above device, and enabling the measurement of external fields over a wide range of intensities. To this end, at least one of the following features can be used:

The interrogation signal can be a specifically phase-code (PC) signal, and one transducer in the pair of transducers is a phase-coded transducer capable of processing said phase-coded interrogation signal, while the other transducer converts a signal without changing its envelope. Any phase coded (e.g., bi-phase coded) transducer forms its maximal response signal in response to a PC coded signal exciting it only when all code intervals of the input signal are summarized and the phases of the code intervals are exactly the same that in the corresponding transducer's code sections. Due to the dependence of the SAW velocity on the external field, the quality of the mentioned phase matching depends on the external electric field. Therefore, a change in the amplitude of the response signal is informative of an external field.

The passive unit may be designed so as to define two wave channels (defined by two delay lines), wherein one wave channel is exposed to the external field to be detected, and the other is screened from the external field. The first and second wave channels have different lengths to ensure the phase shift between two output signals produced by the two delay lines. In this case, the output signal is a vector sum of said two output signals. The provision of the screened channel increases the sensitivity of the sensor and reliability of device as a whole.

A field transformer can be used with the sensor to amplify or concentrate the field influencing the SAW propagation in given proportion to the external field. Such a field transformer aimed to amplify the field may be composed of two capacitors having different values of capacitance and different distances between the capacitor's plates, such that the capacitor with the smaller capacity is that having a smaller distance between the electrodes. The capacitors are connected in parallel and are both mounted at said spot where the external field is to be detected. At a certain relation between the capacitances and the geometric sizes of the capacitors, the intensity of the inner electric field of the capacitor of the smaller capacity can be larger than the intensity of the external field a predetermined ratio. The substrate with said delay line is mounted as the dielectric in the capacitor of the smaller capacity (and larger inner field), and in such a way that the inner field of that capacitor influences the SAW velocity.

Alternatively, such a field transformer may be in the form of a metallic plate (electrode) having a part thereof extending predominantly along the external field lines and ending with a sharp edge in the nearest vicinity of the SAW path. Such an electrode has no connection with the source of the field (e.g., wire), but is placed in the external field to be detected, thereby serves as a concentrator of this field.

Thus, according to yet another aspect of the present invention, there is provided a sensor for mounting at a spot where an external field is to be detected, the sensor comprising:

a substrate made of a material capable of transporting therethrough a wave sensitive to said external field, a first delay line provided on said substrate to form a first wave channel for said wave's propagation contactlessly exposed to action of the external field, said first delay line comprising a first transducer arrangement capable of being actuated by a certain interrogation signal to generate said wave propagating through the first wave channel and capable of converting the wave into a first output signal; and a second delay line provided on said substrate to form a second wave channel for said wave's propagation, said second delay line comprising a second transducer arrangement capable of being actuated by a certain interrogation signal to generate the wave propagating through the second wave channel and capable of converting said wave into a second output signal; wherein said second wave channel is screened from the external field and has the length differing from that of the first wave channel to ensure a phase shift between the first output signal and the second output signal;

the first and the second delay lines of said sensor are connected in parallel to provide an output response signal formed by superposition of said first and second output signals and being thereby informative of the external field.

Preferably, the first (unscreened) wave channel can be designed to change its output signal's amplitude as the external field changes. In one particular case, the amplitude of the output signal decreases with the growth of the external field.

As indicated above, the sensor can be formed in two basic modifications, i.e., with a piezoelectric or electrostriction substrate, and a ferrite substrate, being thereby sensitive to electric and magnetic external fields, respectively.

A number of embodiments of the piezoelectric modification of the sensor will be described below.

According to one embodiment of the sensor, it is intended for detection of external electric fields, and comprises said substrate of piezoelectric material, bearing:

said first transducer arrangement comprising a first pair of transducers placed on a surface of said substrate and forming therebetween said first wave channel constituting a first acoustic channel, said transducers being capable of launching a SAW into said first channel in response to an input electromagnetic signal and converting the SAW into a first output electromagnetic signal;

said second transducer arrangement comprising a second pair of transducers placed on a surface of said substrate and forming therebetween said second wave channel constituting a second acoustic channel, said second pair of transducers being capable of launching SAW into said second channel in response to said input electromagnetic signal and converting the SAW into a second output electromagnetic signal;

thereby, owing to the difference in lengths of said first unscreened and said second screened acoustic channels, the phase of the response signal formed by superposition of said first and said second output signals is indicative of the external electric field.

The difference in length between the two acoustic channels is preferably a fraction of the SAW wavelength in the screened channel.

The above-described sensor effectively detects the presence of external fields, owing to the fact that in one of the mentioned acoustic channels, the amplitude of the output signal depends on the external field, and in the other (screened) channel, does not if, for example, the amplitude of the output signal of the acoustic channel exposed to external electric field decreases as the electric field increases, the response signal (being a vector sum of the output signals of the screened channel and the unscreened channel): a) will never have its amplitude reduced to zero, and b) will be nearer to the phase of the "unscreened" channel output signal as the field increases.

If narrow band transducers are used, their bandwidth are should be such as not to exceed their central frequency shift due to the electric field to be detected. If relatively wide band transducers are used, frequency of the interrogation signal can be selected within the range of the slope of the frequency response of the transducers.

Analogous embodiments can be constructed on the ferrite substrates, to obtain the sensor capable of detecting external magnetic fields.

In the embodiment of the sensor, preferably applicable to its piezoelectric modification, said first pair of the transducers is identical to said second pair of the transducers, wherein one transducer from each pair is a phase coded transducer capable of processing a phase coded signal, and the other—converts a signal without changing its envelope. The use of the phase coded transducers enhances the dependence of the first (unscreened) channel's output signal on the external field, and improves field sensitivity of the sensor. When the external electric field's change causes a multi-phase coded transducer to produce a progressively smaller output signal, this fact, in turn, will make the total response signal of the sensor progressively closer to the output of the second (screened) acoustic channel. Hence, the response signal remains non-zero, which thus enhances the reliability of device.

It is clear that the sensor using a phase-coded signal should be based purely on an electroacoustic effect. Indeed, the distances between electrodes are small (of the order of SAW wavelength). So, their changes due to piezoelectric effect are small too (i.e., this change is proportional to the distance itself). Hence, distances between the electrodes remain independent on the external field. This means that the change in the signal induced by the increase in the external field takes place only due to the change in SAW velocity.

The interrogation signal is a high frequency electromagnetic signal, the frequency of which is determined by the required sensitivity of the passive unit to the external electric field under test. According to acoustic, geometric and technological considerations, the frequency of the interrogator device for so-called piezoelectric embodiments of the sensor and the device can be selected at about 1 GHz. For the so-called ferrite embodiments, the frequency can be higher, e.g., up to 10 GHz.

It is understood, that for all embodiments of the device and the sensor (except for that of resonator type or that with the phase-coded transducers), the interrogation signal is a high frequency pulse with the duration smaller than the delay time of the delay line(s).

In the case of one-channel passive unit of the device, sensitivity of the device can also be improved by increasing the delay time. In the case of the two-channel design, the interrogation signal is preferably a multi-phase-coded high frequency signal matched with codes of the transducers in the sensor at the external field equal to a certain reference value. Hence, the detection of a maximal output signal is indicative of that the external field is equal to its reference value. As previously mentioned, the multi-phase coded interrogation signal increases the sensitivity of the sensor and, additionally, permits to interrogation only one particularly matching sensor. It should be mentioned, that the sensor's sensitivity can be increased by selecting correct parameters of the phase-coded interrogation signal, such as the length of the code interval, a number of phase gradations in the code, a number of bits in the code and, of course, the frequency of the signal.

Electric fields which are detectable by the above-described piezoelectric or electrostriction sensor and device, are preferably those that are substantially static with respect to the sensitive element, i.e., those with a period much greater than the delay time of the piezoelectric sensor.

The above-described device in its remote modification can be successfully used for detecting strong external fields, for example, for determining whether electric voltage is present between high voltage wires in an electric power line. The device can also be utilized for checking the integrity of string insulators in the electric power lines. Yet another application of the sensor is for determining voltages at hard-to-reach places in complex electrical appliances and installations such as switchboards, control panels, electric machines, etc.

According to yet another aspect of the present invention, there is provided a sensor for use in a device for non-contact detection of an external field in the vicinity of an electric wire, the sensor comprising:

a substrate carrying a delay line to define a wave channel for the wave propagation through the substrate, and a field transformer operable to increase intensity of a field within a delay line, as compared to the intensity of the external field outside said delay line, in a known proportion, the increased field affecting a velocity of the wave propagating within the delay line, the delay line comprising:

a transducer arrangement capable of being actuated by an interrogation signal to generate said wave propagating through the wave channel and capable of converting the wave into an output response signal, said wave channel being exposed contactlessly to action of the external field, which effects a change in a velocity of the wave propagation, said output response signal produced by the passive unit being thereby informative of said external field.

Applications of the inventive device should not be limited to the mentioned ones.

To this end, and in accordance with a further aspect of the invention, there is provided a system for remotely detecting the presence of an external field at a plurality of check points to be examined; the system comprising the above-described device comprising one said active unit and a number of said passive units; said passive units of the device being mountable at the respective check points, while the active unit is capable of remotely communicating with said passive units by emitting said number of interrogation signals respectively associated with the number of the passive units, and recognizing the number of respective response signals.

In other words, the system for remotely detecting the presence of, say, an electric field or voltage at a plurality of check points (e.g. of an electric circuit), may comprise a number of passive units and one active unit, wherein each of said passive units and said active unit is provided with an emitting-receiving antenna, and wherein:

each of said passive units is mountable at one of said check points and being responsive to one particular interrogation signal whenever received from said active unit; all said passive units being responsive to different interrogation signals, respectively;

said active unit comprising a transmitter, a receiver and processing means; said transmitter being capable of emitting said different interrogation signals to be received by said respective passive units; said receiver is capable of receiving and recognizing response signals from said passive units, wherein said processing means is adapted to determine the external electric field at each of said check points by comparing a response signal received from the respective passive unit with a corresponding reference signal for further indicating the electric field detected at said check point.

The passive unit may be a piezoelectric or electrostriction sensor with one or two acoustic paths.

it is understood that for determining electric fields at a plurality of check points, such a system must be capable of discriminating between different check points, i.e. must possess a high selectivity. As has been explained, this task can be best resolved if each interrogation signal represents a phase coded signal matched with a code of a particular passive unit; in such a case, the passive unit serves as a matched filter. A variety of such interrogation signals can be achieved by phase coding. If the transducers of the passive units are designed according to the respective phase codes, each particular interrogation signal will be received by only one (matching) passive unit. Again, both the sensitivity and the selectivity of the system can be improved by judiciously selecting parameters of the phase coded signal (such as the length of the code interval, number of phase gradations in the code, the code rank, the carrier frequency of the signal).

In a particular example, the system for remotely detecting the presence of high voltage between the wires of an electric power line will comprise a required number of the passive units, each mountable on a particular wire of the electric power line; all said passive units being responsive to different interrogation signals, respectively, said active unit being designed in the form of a portable remote apparatus capable of selectively or simultaneously communicating with the respective passive units to allow detection and indication of the presence of high voltage regarding the particular wires bearing the respective passive units.

According to another application, the system having a number of sensors (passive units) and one active unit can be used for checking the integrity of suspension insulator strings of an electric power line. In this case, the passive units can be mounted on the bodies of respective insulator strings. If a particular insulator is its regular state, the respective passive unit will cause the system to detect the presence of a predetermined nominal voltage applied to the insulator's ends. If the insulator is ruptured completely or partially, the detected voltage will differ from the nominal value.

Both the system for checking the voltages on the wires, and the system for checking the condition of suspension insulator strings in electric power lines can be fulfilled in situ by passing along the power line, where said passive units are preliminarily mounted, with the aid of any vehicle carrying the portable active unit and remotely providing the measurements of interest. Such a method is extremely useful and effective in emergency situations.

BRIEF DESCRIPTION OF THE DRAWINGS

In order to understand the invention and to see how it may be carried out in practice, a preferred embodiment will now be described, by way of non-limiting example of the piezoelectric modification only, with reference to the accompanying drawings, in which.

DETAILED DESCRIPTION OF PREFERRED EMBODIMENTS

Figure 1:
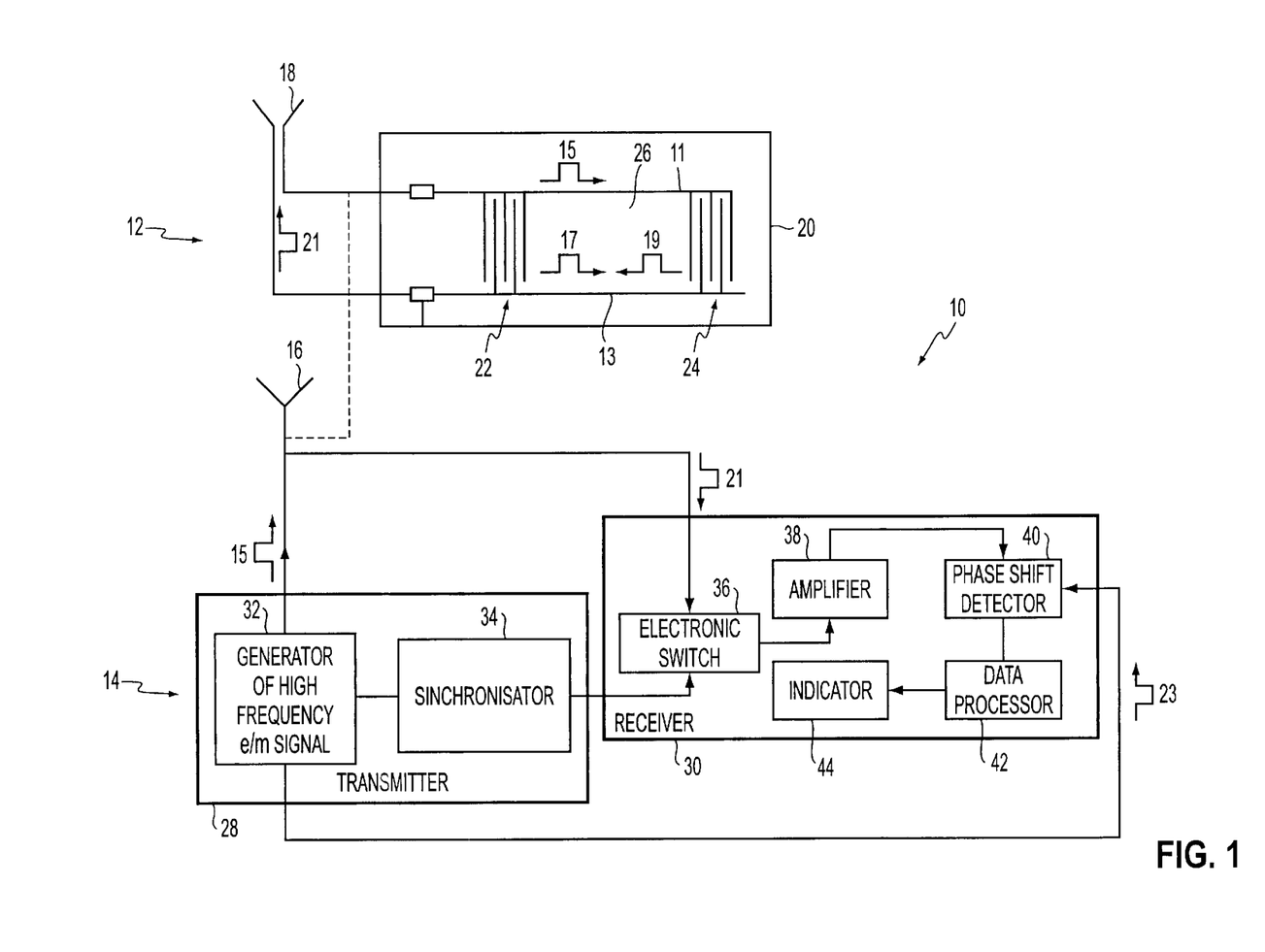
FIG. 1 is a schematic diagram of a basic piezoelectric-based device according to the invention, having a passive unit and an active unit.
Figure 2:
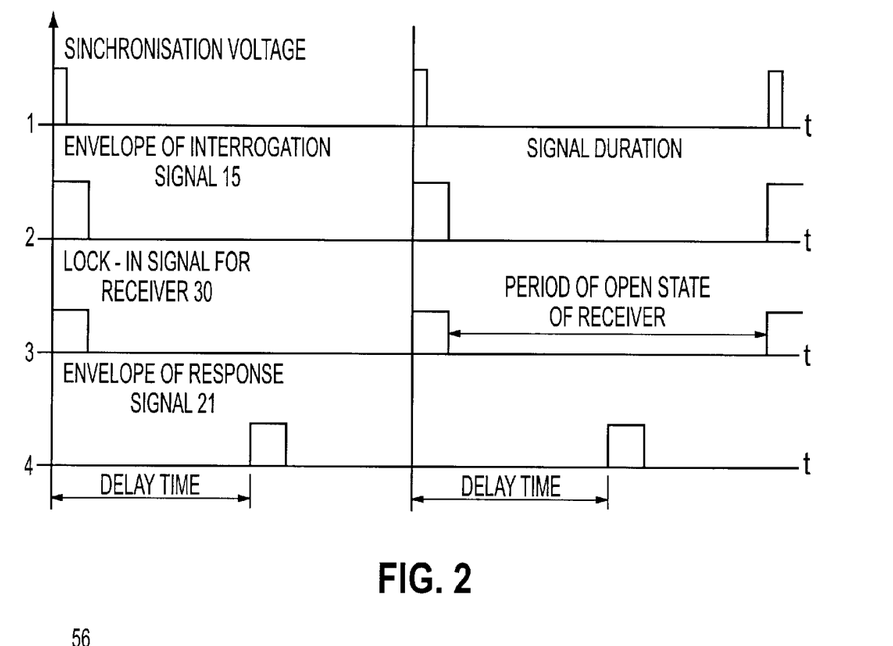
FIG. 2 is an exemplary time diagram of operation of the device shown in FIG. 1.

FIG. 1 illustrates a sensor device 10 for the detection of an external field symbolically indicated with arrows marked E. A combined time diagram of the device operation is schematically illustrated in FIG. 2. In the present example, the device 10 is intended for the detection of the existence of the electric field E in the vicinity of a wire (which is not specifically shown). The device 10 comprises such main constructional parts as a passive unit 12 placed in the external electric field, and an active unit 14. The passive and active units are in high frequency (HF) electromagnetic communication with each other. The device is intended for remote and non-contact detection of electric fields, so the unit 14 is distanced from the unit 12 and both units have high frequency emitting-receiving antennas: HF antenna 16 of the active unit 14 and HF antenna 18 of the passive unit 12.

In this embodiment (where electric fields are to be detected), the passive unit 12 comprises a piezoelectric substrate 20, which bears on its surface a transducer arrangement forming an acoustic channel which serves as a working wave channel of the device. The transducer arrangement is composed of a pair of transducers 22 and 24 spaced from one another so as to form between and under them an acoustic channel 26. The two transducers 22 and 24 and the acoustic channel 26 in the piezoelectric substrate constitute a piezoelectric delay line with the delay time defined by the external electric field E. Antenna 18 and transducers of the passive unit 12 are connected in parallel by common electrical buses 11 and 13; the antenna 18 is capable of working either in the receiving or in the transmitting regime at a time. More particularly, in the receiving regime, the antenna 18 receives from the active unit 14 and feeds to the transducers 22, 24 an interrogation HF electromagnetic signal schematically marked 15 (see also FIG. 2, time axis 2). The interrogation signal 15 is converted by the transducers 22, 24 into two acoustic signals, respectively, schematically indicated as 17 and 19, which propagate along the acoustic path 26 in the form of SAWs to be received with a delay by the same transducers and then converted into an electromagnetic response signal 21. Now, the antenna 18 works in the transmitting regime and transmits the response signal to the active unit (see time axis 4 in FIG. 2).

The active unit 14 comprises a transmitter 28 and a receiver 30; the antenna 16 of the active unit being also a transmitting-receiving antenna. The transmitter 28 comprises a generator 32 of the HF interrogation signal controlled by a synchronizing circuit 34 (time axis 1 in FIG. 2). In the present example of FIG. 1, the interrogation signal is an amplitude modulated HF signal (pulse), wherein the duration of its pulse-like envelope is selected to be less than the delay time of the piezoelectric delay line (see time axes 2 and 4 in FIG. 2). It should be noted that, alternatively, phase-coded transducers can be used, in which case the interrogation signal is phase-coded, as will be described below with reference to FIG. 3.

The receiver 30 comprises an electronic switch 36 coupled to the antenna 16 and controlled by the synchronizing circuit 34 to receive only the response signal arriving from the passive unit 12 (lock-in signal is shown in FIG. 2, time axis 3). The received response signal is amplified by an amplifier 38 and fed to a phase shift detector 40 which compares the response signal with a reference signal 23. Output signal from the detector 40 reflecting the phase shift between the reference and the response signals is then processed by a data processor 42, and an indicator 44 presents information on the presence (and optionally, on the intensity) of the external electric field.

In an alternative embodiment, the units 12 and 14 may be situated in close proximity to each other to form just a non-contact sensor of electric fields or voltages. In such a case, the units are electrically coupled as shown by the dotted line, and the sensor device does not need any antennas.

The procedure of evaluation of the electric field amplitude by the active unit 14 can be as follows. As the field is quasi-static, (e.g., its frequency is in the range of 50 to 400 Hz, time period 20–2.5 ms, while the delay time of the delay line having the length 5 cm is of about 7 $\mu$sec), the phase shift of the response signal with respect to the reference signal will oscillate with the frequency of the electric field. The procedure can consist of the following steps:

1) determining the minimal total phase shift;
2) subtracting it from the total phase shift which gives the relative phase shift;
3) determining the relative shift maximum;
4) calculating the field amplitude using a predetermined built-in ratio between the sought-for amplitude and the observed maximal relative phase shift, taking into account characteristics of the passive unit 12.

Figure 3:
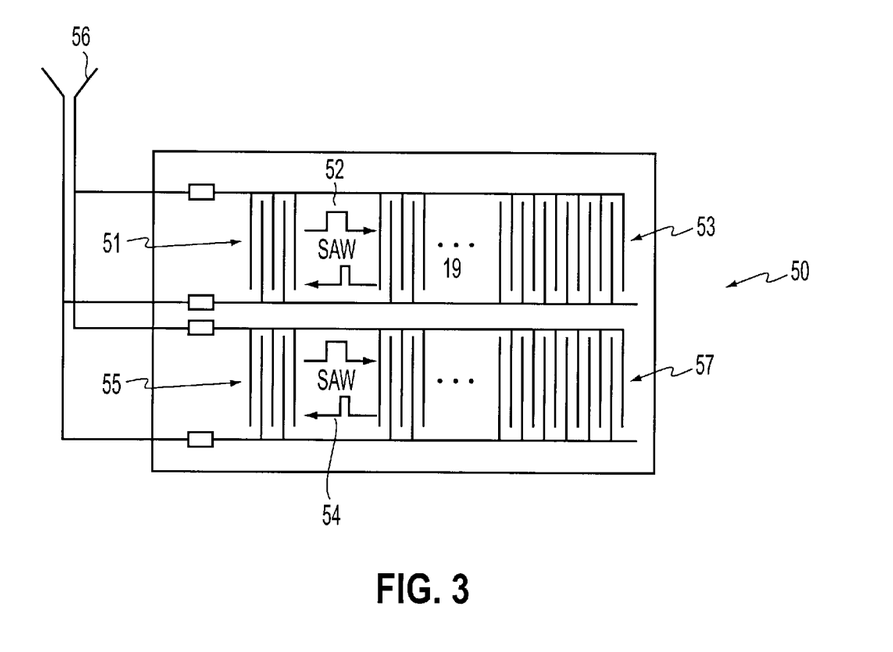
FIG. 3 is a schematic diagram of a piezoelectric-based sensor with improved sensitivity, which can be used as the passive unit in the device shown in FIG. 1.

FIG. 3 illustrates a highly sensitive piezoelectric sensor 50 which can be used as a passive unit in the sensor device 10 (FIG. 1) or a system according to the invention. In the present example, the sensor 50 is designed so as to be responsive to a phase-coded interrogation signal, and comprises two acoustic channels 52 and 54. It should, however, be noted that the use of a phase-coded interrogation signal can be implemented with the one acoustic channel based passive unit of FIG. 1 as well. A phase-coded signal presents a signal formed by pieces of sinusoids, each piece starting with its own initial phase according to the code used. The acoustic channel design produces a maximal output signal when all code intervals of the SAW propagating through the channel excite the transducer, providing that the code and phases in the SAW propagating through the channel match the code and phases used in the transducer. The explanation hereinbelow is given for the case of a bi-phase coded interrogation signal (the initial phase can be zero or $\pi/2$), for the sake of simplicity.

Thus, the sensor 50 comprises a first acoustic channel 52 that is formed in the substrate between a pair of transducers 51, 53 and is contactlessly exposed to the external electric field. An additional acoustic channel 54 is created in the substrate between a pair of additional transducers 55, 57, and is screened (together with the transducer 55, 57) from the external field, so that its delay time is independent from the external field intensity. The screening of the additional acoustic channel 54, which is to be defended from the penetration of the electrical/magnetic filed force lines, can be implemented by using any suitable known means. For example, a metallic surface with presents an equipotential conductive screen can be used. The sensor 50 is provided with a receiving-emitting antenna 56 for communicating with both acoustic channels 52 and 54 via their buses.

It should be noted that the provision of the second acoustic channel 54 screened from the external field, to which the other channel 52 is exposed, is not used for comparing signals generated in both channels for evaluating the external field, as in the conventional detection techniques. Here, the two channels, one exposed to and the other screened from the external field, are used to produce an output signal, which is a vector sum of two output signals of the two channels. This is aimed at obtaining, in any case, a non-zero output signal of the passive unit, thereby enhancing the reliability of a device. Hence, if the external field value is significantly different from that providing a maximal output signal of the channel 52, no signal will be produced by the channel 52, and the sum signal will be equal to the signal produced by the screened channel 54. In other words, the provision of the screened channel 54 increases the sensitivity of the sensor 50 and reliability of device as a whole.

In this embodiment, one transducer (53 or 57) belonging to any acoustic channel is a multi-tapped inter-digital transducer (IDT) for processing an interrogation signal with a particular phase-code predetermined for this sensor and being the same for both acoustic channels. The second transducer (51 or 55) is a strictly periodic IDT with a small number of electrodes, having the central frequency and the bandwidth corresponding to the phase coded signal in use. In this embodiment, both of the acoustic channels 52 and 54 are almost identical, though they differ in propagation length, say, by a quarter of the wavelength of the SAW and, of course, in that the second acoustic channel 54 is protected from the external electric field. Since all the transducers 51, 53, 55 and 57 are connected in parallel to the antenna 56, the interrogation signal excites all the transducers, and the output signal of the two-channel design is a vector sum of two output signals of the two channels, i.e., (in turn) of the four transducers from both acoustic channels.

As explained above, the maximal output signal of the channel can be produced when the SAW propagating through the channel matches with the transducer. This condition takes place at a predetermined external field providing the certain SAW velocity value used for the transducer design. At this condition, a maximal reference value of the amplitude of the output signal produced by the channel can be "n" times higher than the amplitude of one code interval of the SAW, where "n" is both the number of the code intervals in SAW and the number of code sections in the transducer. Due to the dependence of the SAW velocity on the external electric field, the degree of the matching will also depend on the electric field, thus the output signal will alter with changes of the external electric field.

In the screened channel 54, the PC many-tapped IDT transducer 57 will convert the interrogation signal into a short SAW pulse of a high amplitude, if the codes match. The SAW pulse, when received by the second strictly periodic transducer 55 of the screened channel, will be converted into a strong electromagnetic signal having the same shape as that of the SAW. In the same channel, the PC interrogation signal, after being converted by the strictly periodic IDT transducer 55, propagates as a PC SAW signal to the PC transducer 57 which, if the codes match, will convert it into a short electromagnetic output pulse of high amplitude.

Based on the above, when the external electric field alters the velocity of SAW in the first acoustic channel 52, it leads to a discrepancy between the PC interrogation signal and the PC transducer 53, thus resulting in both a decrease of the output signal outgoing from this channel, and its phase shift. The vector diagram shown in FIG. 4 indicates that the higher the electric field E, the lower the output signal A of the first unscreened channel 52 and the greater its phase shift: see three vectors $A(E_1)$, $A(E_2)$, and $A(E_3)$ of the output signal A, at three different values of the external electric field $E_1 < E_2 < E_3$. Vector B of the output signal of the second (screened) channel 54 is shifted by 90° relative to axis A.

Figure 4:
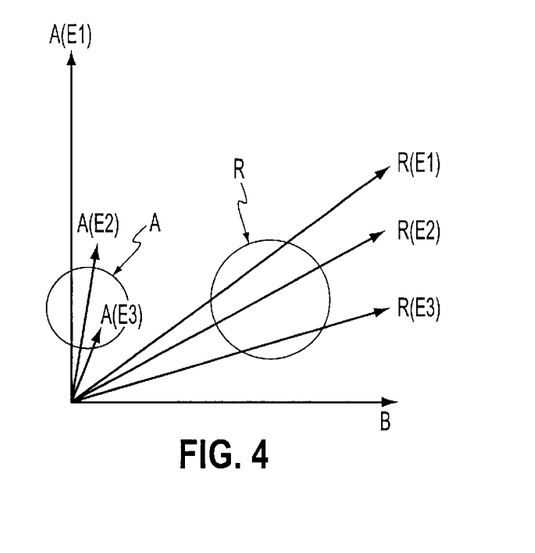
FIG. 4 is a schematic vector diagram illustrating how a response signal is developed in the piezoelectric sensor shown in FIG. 3.

The three resulting vectors of the response signal are marked R. The stronger external electric field applied to the passive unit 50, the smaller will be the amplitude of the output signal A of the unscreened channel 52, and the nearer to the phase of signal B will be the phase of the resulting response signal R.

The illustrated embodiment transforms a small phase shift directly produced by the electric field (any of vectors A) into a significant phase shift in the response signal (the corresponding vector R). It can also be seen, that owing to the two-channel design and the use of the phase coded interrogation signals, the amplitude of the response signal R is less affected by the electric field under test.

Figure 5:
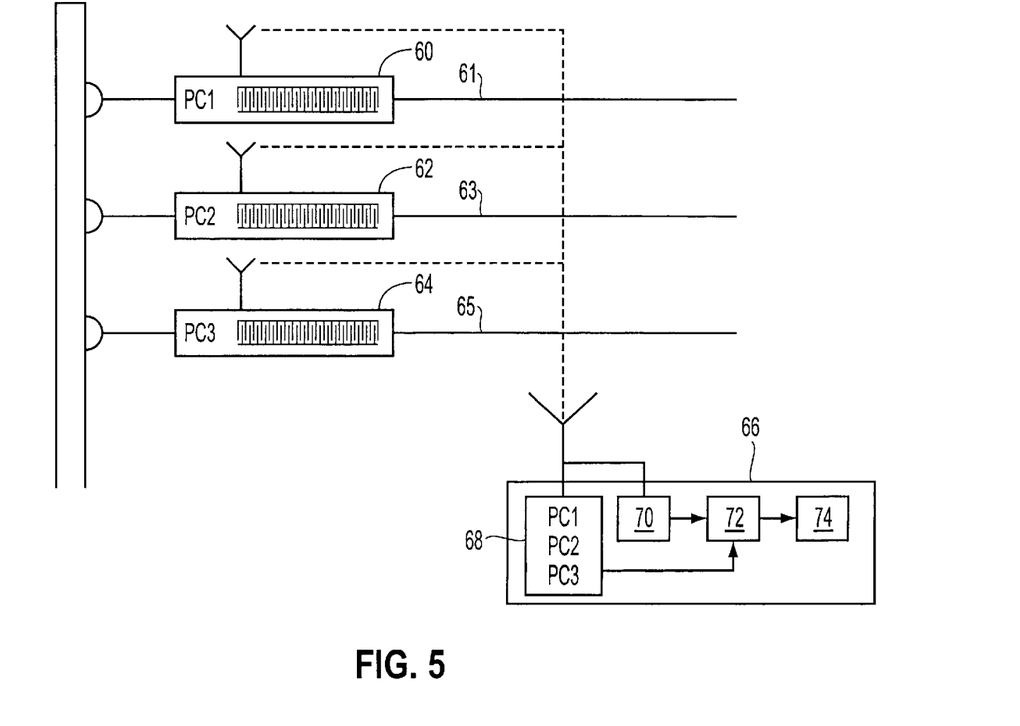
FIG. 5 is a schematic diagram of an example of a system according to the invention comprising a plurality of passive units.

FIG. 5 illustrates an exemplary system for remote contactless detection of electric voltages in a power line. Three passive units 60, 62 and 64 with HF antennas are mounted on three respective high voltage wires 61, 63, 65 of the power line. The passive units are coded by different phase codes, namely, the passive unit 60 is coded by a phase code $PC_1$, the unit 62—by phase code $PC_2$, and the unit 64—by phase code $PC_3$.

The system comprises a combined portable active unit 66 including a transmitter 68, a receiver 70, a processing means 72 and an indication means 74. Principle of operation of the active unit 66 is similar to that described with reference to FIGS. 1 and 2. The difference is in that the transmitter 68 is capable of selectively (or simultaneously) emitting three different interrogation signals, being coded by phase codes $PC_1$, $PC_2$ and $PC_3$, respectively. Also, the indication means 74 are capable of registering readings of the electric field with respect to each particular code. Whenever a particularly coded interrogation signal is emitted by the active unit 66, it is correctly processed only by the passive unit coded by the same phase code. As a result, the operator is able either to provide the total checking of the wires, or to select a particular wire where the voltage is to be checked and to obtain indication concerning the presence (and optionally the intensity) of the electric field around any specific wire. Accurate measurements over a wide range of voltages can be provided if the passive units are designed as the two-channel sensors (50 shown in FIG. 3).

Figure 6:
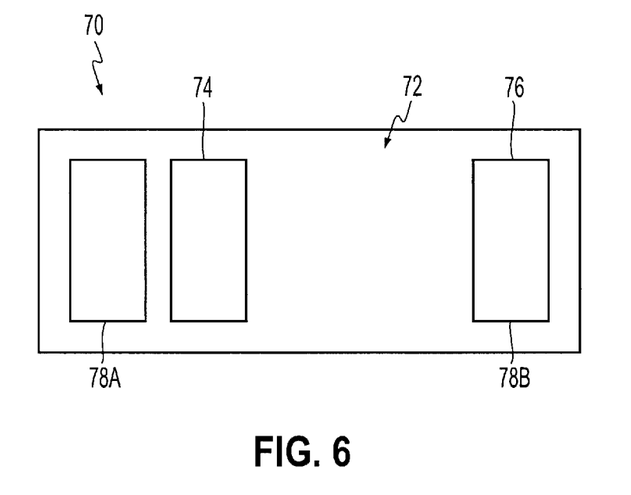
FIG. 6 is a schematic illustration of a sensor according to the invention utilizing a resonator delay line.

FIG. 6 illustrates a block diagram of a sensor 70 suitable to be used in the sensor device according to the invention. Here, a delay line 72 in an acoustic channel is a resonator delay line, which is characterized by relatively small dimensions at a relatively high total delay time, as compared to the delay lines of the previously described examples. The resonator delay line 72 is formed by one transducer 74 placed on the surface of a piezoelectric substrate 76 between a pair of reflectors 78A and 78B defining the wave channel, which in an acoustic resonator. Each of the reflectors 78A and 78B may be in the form of a pattern of parallel grooves, lugs, metal strips, etc., on the surface of the substrate 76. Thus, a SAW launched by the transducer 74 is successively reflected by the reflectors 78A and 78B, thereby producing a considerable resonance response signal on the transducer at a specific resonance frequency of the delay line. Since the wave channel is subjected to the direct action of the external field, any change in the external electric field will affect velocity of propagation of the SAW between the reflectors. To achieve a resonance condition in the wave channel, the double time of run between both reflectors should be an integer number of time periods of the carrier frequency of a signal. Hence, the change of SAW velocity will cause a shift of the resonance frequency indicative of the intensity of the external electric field.

As indicated above, a field transformer can be used with the sensor device according to the invention as an amplifier or concentrator of an external field, to thereby enable detection of low voltages (weak external fields). In the example of FIGS. 7A–7D, a field transformer is used as an amplifier of an external field to be detected.

Figure 7A:
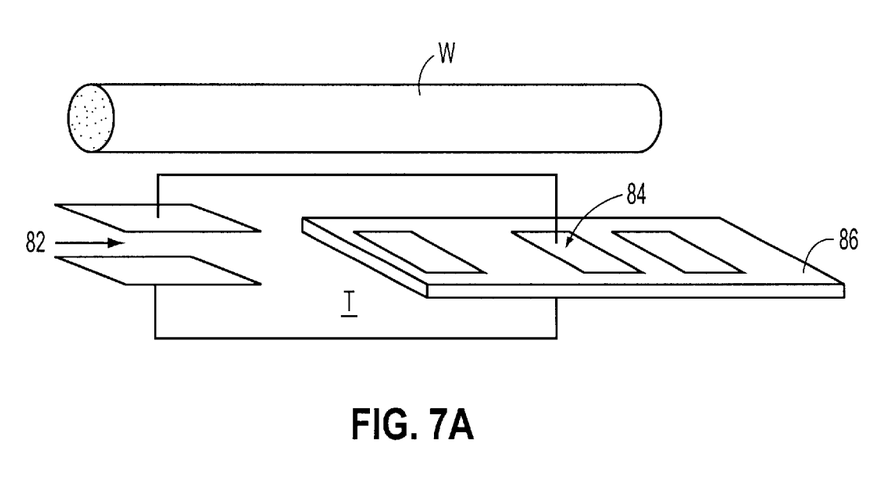
FIGS. 7A–7D illustrate several examples of the sensor according to the invention utilizing a field transformer as an amplified of the external electrical field to be detected.

As schematically illustrated in FIG. 7A, field transformer T is located in the vicinity of an electric wire W, where an external field is to be detected. The field transformer T consists of two parallel plate capacitors 82 and 84 connected in parallel and having no connection with the line wire W.

Each capacitor is composed of a pair of spaced-apart parallel metal plates spaced by an insulator (dielectric) layer. The fast capacitor 82 is characterized by the dielectric layer permittivity $\epsilon_1$, distance $d_1$ between the electrodes, and capacity $C_1$, and the second capacitor 84 is characterized by the dielectric layer permittivity $\epsilon_2$, distance $d_2$ between its electrodes, and capacity $C_2$. If these parameters satisfy the following conditions: $\epsilon_2 > \epsilon_1$, $d_1 > d_2$, $C_1 > C_2$, an electric field in the second capacitor 84 is $d_1/d_2$ times larger than the actual external electric field E, which is to be detected. Hence, the delay line must be located within the higher-inner-field capacitor 84. The capacitor 84 may be made of two metallic films deposited on a piezoelectric substrate in predetermined regions, as will be described more specifically further below, and the capacitor 82 is made as an air parallel plate capacitor.

It should be understood that the above conditions can be easily met in the capacitors 82 and 84. For example, the relative permeability of $LiNbO_3$ (which is a dielectric widely used in SAW technique) is about 40. The dimensions of the air capacitor 82 can be taken independently of that of the SAW element. The capacity of two parallel electrodes of 1×1 mm dimensions deposited on the opposite surfaces of a piezoelectric substrate of 1 mm thickness is about a few picofarad. By this, an electric field affecting the SAW propagation in the acoustic channel is larger, in the known proportion, than the actual external field existing in the vicinity of the wire, and therefore the relatively weak external field can be detected with higher sensitivity.

Figure 7B:
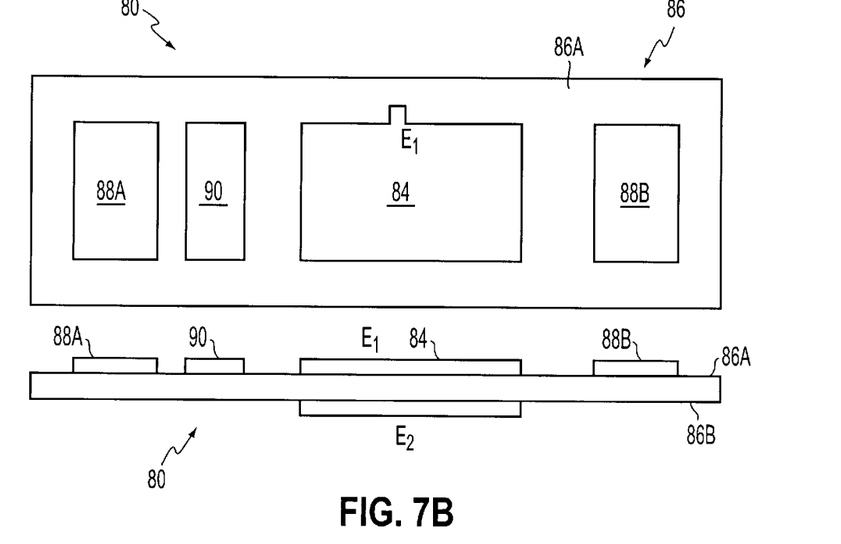
Figure 7C:
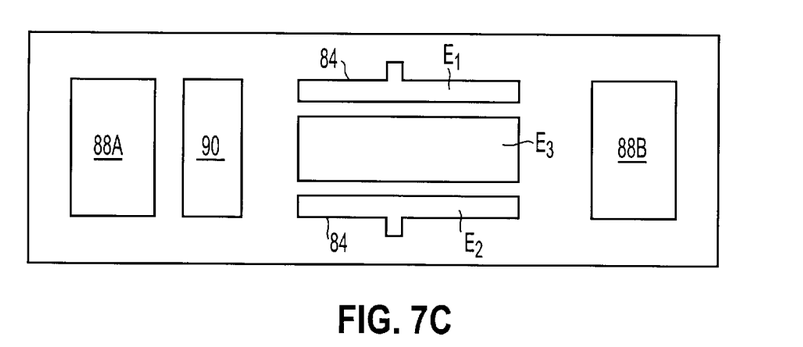

FIGS. 7B–7C show three examples, respectively, of the resonator-based passive unit 80 with the capacitor 84. The passive unit 80 comprises a piezoelectric substrate 86 carrying on its surface two spaced-apart reflectors 88A and 88B, a transducer 90 located in the space between the reflectors, and the electrodes of the capacitor 84 located on the surfaces of the delay line substrate in such places that an inner field of this capacitor affects the SAW propagation within a region between the transducer 90 and the reflector 88B.

In the example of FIG. 7B, the opposite plates $E_1$ and $E_2$ of the capacitor 84 are deposited on opposite surfaces 86A and 86B, respectively, of the piezoelectric substrate 86. With this configuration, the external electric field provides a vertically polarizing electric field in the region of the wave propagation.

In the example of FIG. 7C, the electrodes $E_1$ and $E_2$ of the capacitor 84 located on the common surface of the substrate are connected in parallel. These electrodes are also connected with one plate of the other capacitor 82 (not shown here) located outside the acoustic channel in the vicinity of the line wire. The opposite plate of the capacitor 84 (now shown here) is located on the opposite side of the substrate and is connected with the other plate of the capacitor 82. Hence, the substrate forms a dielectric layer between the electrodes of the capacitor 84. An additional electrode $E_3$ is deposited on the same surface of the substrate, where the electrodes $E_1$ and $E_2$ are located, and acts as a SAW wave-guide element. With this configuration, the electric field in the region of the SAW propagation is perpendicular to the surface of the substrate, and can be greater than that of the above-described example of FIG. 7B. In other words, with the same intensity of the external field, the configuration of FIG. 7C enables even more increase of the affecting field inside the capacitor 84.

Figure 7D:
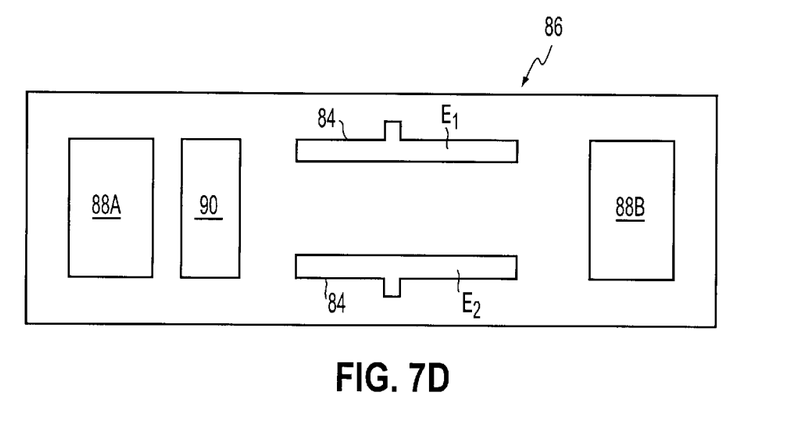

In the example of FIG. 7D, the opposite plates $E_1$ and $E_2$ of the capacitor 84 are deposited on the common surface of the piezoelectric substrate 86 in a spaced-apart parallel relationship. With this configuration, a shear horizontal electric field exists in the region of the SAW propagation.

Figure 8A:
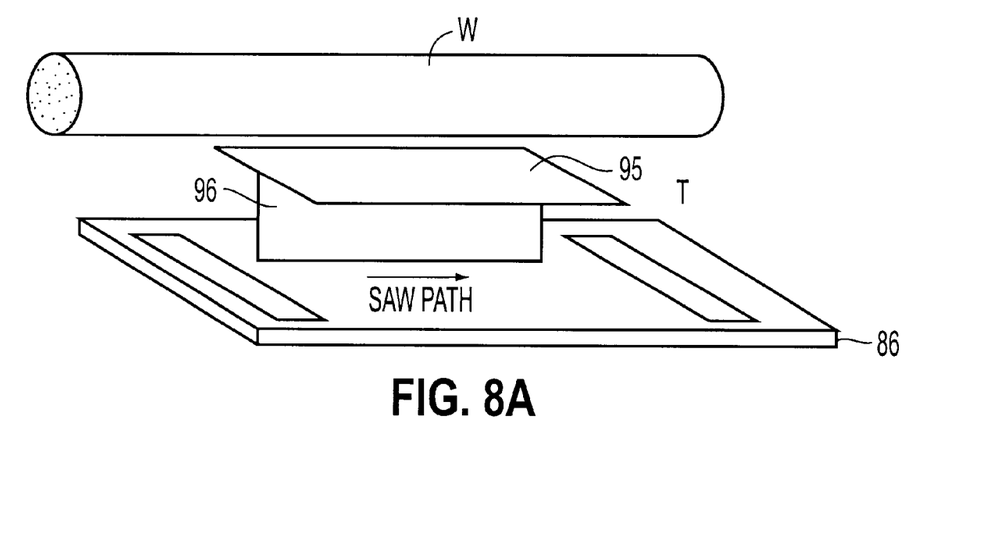
FIGS. 8A and 8B illustrate one more example of the sensor utilizing a field transformer as a concentrator of the external field.
Figure 8B:
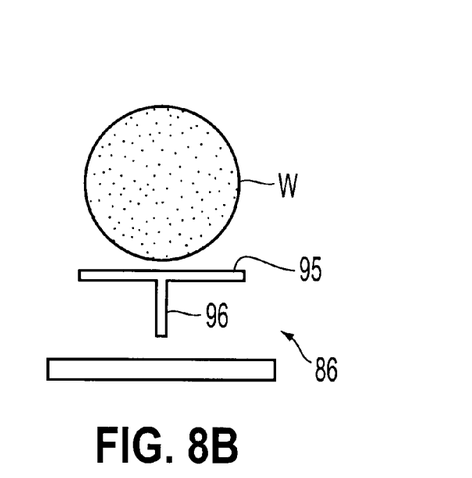

FIGS. 8A and 8B illustrate, respectively, front and side view of an electric wire W with a field transformer T located in the vicinity thereof (in a non-contact manner) and serving a concentrator of an external field to be detected. In the present example, the concentrator T is composed of two electrodes 95 and 96 located inside the sensor device (passive unit). The electrode 95 (the provision of which is optional) is located near the wire W, and the electrode 96 extends predominantly along the external field in the vicinity of the wire and has a sharp edge (i.e., with a very small radius of curvature of $R_c$), that is located in the nearest vicinity of the delay line. The sensor device with such a field concentrator T operates in the following manner. An external electric field at the location of the electrode 95 causes redistribution of electric charge into the metallic electrode 96. Since the magnitude of the electric field in the close vicinity of the sharp edge is proportional to $1/R_o$, a field amplification coefficient is of order of $R_w/R_o$, wherein $R_w$ is the radius of the wire W. Distances about 0.2–0.5 mm between the sharp edge and the delay line can be used, thereby enabling to achieve large amplification coefficients.

While the present invention has been described with reference to the specific examples and drawings, it should be appreciated that other modifications and combinations of the passive and active units can be designed which also form part of the present invention.

What is claimed is:

1. A sensor for use in a device for non-contact detection of an external field by positioning the sensor at a spot where the external field is to be detected, the sensor comprising a delay line, which is to be exposed contactlessly to action of the external field and comprises:

a transducer arrangement that is provided on a substrate made of a material capable of transporting therethrough a wave sensitive to said external field, and defines a wave channel for the wave propagation through the substrate exposed to the external field so as to be directly affected by the external field, the transducer arrangement being capable of being actuated by an interrogation signal to generate the wave propagating through the wave channel and capable of converting the wave into an output response signal, said external field affecting a change in a velocity of the wave propagation through the substrate, said output response signal being thereby informative of said external field.

2. The device according to claim 1, wherein said external field to be detected is a magnetic field said substrate is made of ferrite, and said wave is a magnetic wave.

3. The device according to claim 1, wherein said external field to be detected is an electric field, said substrate being made of a piezoelectric material, and said wave being a surface acoustic wave (SAW).

4. The device according to claim 1, wherein said external field to be detected is an electric field, said substrate being made of an electrostriction material, and said wave being a surface acoustic wave (SAW).

5. The sensor according to claim 1, wherein said transducer arrangement comprises one pair of transducers defining said wave channel therebetween.

6. The sensor according to claim 1, wherein said transducer arrangement comprises a phase-coded transducer capable of being actuated by a phase coded interrogation signal, said output response signal being maximal at a predetermined external field, at which the interrogation signal matches with the code of the transducer, the value of said output response signal being indicative of the external field affecting the velocity of wave propagation.

7. The sensor according to claim 1, also comprising an additional delay line formed by an additional transducer arrangement defining an additional wave channel wherein said additional wave channel is screened from said external field and has a propagatior length different from that of the additional wave channel, said output response signal being a vector sum of output signals of the two wave channels.

8. The sensor device according to claim 1, and also comprising a field transformer operable to increase intensity of a field affecting the velocity if the wave propagation within the channel, as compared to the external field intensity, according to a known proportion.

9. The sensor according to claim 8, wherein said field transformer is composed of two capacitors of different values of a capacity and a distance between the capacitor plates, such that the capacitor of a smaller capacity has a smaller distance between its plates, as compared to the other capacitor, the two capacitors being connected in parallel and being mounted at said spot where the external field is to be detected, the capacitor of the smaller capacity enclosing said delay line in a dielectric space between its place, the inner field of said capacitor of the smaller capacity affecting the velocity of the wave propagation through the channel.

10. The sensor according to claim 8, wherein said field transformer comprises a metal element having a part thereof formed with a sharp edge, the field transformer serving as a concentrator of the external field, which is to be detected, within the delay line, when said metal plate is located in said spot so as to extend predominantly along the external field, and said sharp edge is located in the close vicinity of the delay line.

11. A sensor for use in a device for non-contact detection of an external field in the vicinity of an electric wire, the sensor comprising:
a substrate carrying a delay line formed by a transducer arrangement on the substrate to define a wave channel for the wave propagation through the substrate; and
a field transformer operable to concentrate the external field of a given voltage to thereby produce an increased intensity of the field within the delay line exposed to an increased intensity field in a known proportion, the increased intensity field directly affecting a velocity of the wave propagating within the delay line; wherein the transducer arrangement is capable of being actuated by an interrogation signal to generate said wave propagating through the wave channel and capable of converting the wave into an output response signal, said wave channel being exposed contactlessly to action of the increased intensity field created by said field transformer and proportional to the external field to be measured, which effects a change in the velocity of the wave propagation through the substrate said output response signal produced by the passive unit bent thereby informative of said external field.

12. A device for non-contact detection of an external field, comprising said sensor according to claim 1, and an active unit operable to emit said interrogation signal to be received at said sensor, receive said output response signal and process said output response signal for determining and indicating the external field.

13. A device for non-contact detection of an external field, comprising:
active and passive units, wherein the passive unit is to be positioned at a spot where the external field is to be detected, and the active unit is operable to emit an interrogation signal to be received at the passive unit, receive an output response signal coming from the passive unit, and process said output response signal for determining and indicating the external field, the passive unit comprising:
a substrate to be exposed to the external field so as to be directly affected by the external field, the substrate being made of a material capable of transporting therethrough a wave sensitive to said external field, and
a delay line provided on said substrate to define a wave channel for the wave propagation through the substrate exposed to the external field, the delay line comprising a transducer arrangement capable of being actuated by said interrogation signal to generate said wave propagating through the wave channel and capable of converting the wave into said output response signal, said wave channel being exposed contactlessly to action of the external field, which effects a change in a velocity of the wave propagation, said output response signal produced by the passive unit being thereby informative of said external field.

14. The device according to claim 13, wherein said external field to be detected is a magnetic field, said substrate is made of ferrite, and said wave is a magnetic wave.

15. The device according to claim 13, wherein said external field to be detected is an electric field, said substrate is a piezoelectric substrate and said wave is a surface acoustic wave (SAW).

16. The device according to claim 13, wherein said transducer arrangement comprises a pair of transducers placed on a surface of said substrate and forming therebetween said wave channel, said pair of transducers being capable of launching said wave in the wave channel whenever the interrogation signal is received, and converting the wave into said output response signal having a phase shift informative of the external field.

17. The device according to claim 13, wherein said delay line is a resonator delay line characterized by a certain reference resonance frequency value, the resonator delay line being formed by a pair of reflectors placed on a surface of the piezoelectric substrate and said transducer arrangement in the form of a single transducer between the reflectors defining the wave channel; the external electric field in the vicinity of said wave channel effecting a shift of a resonance frequency of the resonator delay line from said certain reference resonance frequency value, said shift being informative of the shift in intensity of the external electric field from a reference value.

18. The device according to claim 13, wherein said active unit comprises a signal source, a receiver and processing means capable of determining to external field by processing the output response signal sad a reference signal for further indicating the determined field.

19. The device according to claim 13, wherein said active unit is adapted to be positioned remotely from the passive unit; both the active and passive units are provided with respective emitting-receiving antennas, and said signal source of the active unit constitutes a transmitter, thus enabling safe non-contact and remote detection of external fields and electric voltages.

20. The device according to claim 13, and also comprising a field transformer operable to increase intensity of a field within the delay line, as compared to the intensity of the external field outside the delay line, according to a known proportion, the increased field affecting the velocity of the wave propagation within the channel.

21. A sensor for sensitive detection or external fields, the sensor being mountable at a spot where an external field is to be detected and comprising:
- a substrate made of a material capable of transporting therethrough a wave sensitive to said external field,
- a first delay line provided on said substrate to form a first wave channel for said wave's propagation contactlessly exposed to action of the external field, said first delay line comprising a first transducer arrangement capable of being actuated by a certain interrogation signal to generate said wave propagating through the first wave channel and capable of converting the wave into a first output signal; and
- a second delay line provided on said substrate to form a second wave channel for said wave's propagation, said second delay line comprising a second transducer arrangement capable of being actuated by a certain interrogation signal to generate the wave propagating through the second wave channel and capable of converting said wave into a second output signal; wherein said second wave channel is screened from the external field and has the length differing from that of the first wave channel to ensure a phase shift between the first output signal and the second output signal;
- the first and the second delay lines of said sensor are connected in parallel to provide an output response signal formed by superposition of said first and second output signals and being thereby informative of the external field.

22. The sensor according to claim 21, wherein said first wave channel is designed to change its output signal's amplitude as the external field changes.

23. The sensor according to claim 21, designed for detecting external magnetic fields and utilizing the substrate made of a ferrite.

24. The sensor according to claim 21, designed for detecting external electric field and voltages, said substrate made of a piezoelectric material.

25. The sensor according to claim 21, designed for detecting external electric fields and voltages, said substrate made of an electrostriction material.

26. The sensor according to claim 24, wherein said piezoelectric substrate bears:
- said first delay line comprising a first pair of transducers placed on a surface of said substrate and forming therebetween said first wave channel constituting a first acoustic channel, said transducers being capable of launching a SAW into said first channel in response to an input electromagnetic signal and converting the SAW into a first output electromagnetic signal;
- said second delay line a second pair of transducers placed on a surface of said substrate and forming therebetween said second wave channel constituting a second acoustic channel, said second pair of transducers being capable of launching SAW into said second channel in response to said input electromagnetic signal and converting the SAW into a second output electromagnetic signal;
- thereby, owing to the difference in lengths of said first and said second acoustic channels, the phase of the response signal formed by superposition of said first and said second output signals is indicative of the external electric field.

27. The sensor according to claim 26, wherein the difference in length between the two acoustic channels is equal to a quarter of the SAW wavelength in the second channel.

28. The sensor according to claim 24, wherein said electrostriction substrate bears:
- said first delay lime comprising a first pair of transducers placed on a surface of said substrate and forming therebetween said first wave channel constituting a first acoustic channel, said transducers being capable of launching a SAW into said first channel In response to an input electromagnetic signal and converting the SAW into a first output electromagnetic signal;
- said second delay lime a second pair of transducers placed on a surface of said substrate and forming therebetween said second wave channel constituting a second acoustic channel, said second pair of transducers being capable of launching SAW into said second channel in response to said input electromagnetic signal and converting the SAW into a second output electromagnetic signal;
- thereby, owing to the difference in lengths of said first and said second acoustic channels, the phase of the response signal formed by superposition of said first and said second output signals is indicative of the external electric field.

29. The sensor according to claim 28, wherein the difference in length between the two acoustic channels is equal to a quarter of the SAW wavelength in the second channel.

30. The sensor according to claim 21, wherein all said transducers are narrow band transducers.

31. The sensor according to claim 21, wherein said first pair of the transducers is identical to said second pair of the transducers, and wherein one transducer from each pair is capable of processing a phase coded signal and the other transducer converts a signal without changing its envelope.

32. A system for remotely detecting the presence of an external field at a plurality of check points to be examined, utilizing the device according to claim 13, comprising one said active unit and a number of said passive units; said passive units of the device being mountable at the respective check points, while the active unit is capable of remotely communicating with said passive units by emitting said number of interrogation signals respectively associated with the number of the passive units and recognizing the number of respective response signals.

33. The system according to claim 32, wherein each of said passive units comprises a pair of piezoelectric delay lines each including a phase-coded transducer, and wherein each of said interrogation signals represents a phase-coded signal matched with the phase-coded transducer's code of a particular passive unit; thereby each of the passive units serving as a matched filter.

34. The system according to claim 32, designed for remotely detecting the presence of high voltage between wires of an electric power line and comprising a required number of the passive units, each mountable on a particular wire of the electric power line, all said passive units being responsive to different interrogation signals, respectively, said active unit being designed in the form of a portable remote apparatus capable of selectively or simultaneously communicating with the respective passive units to allow detection and indication of the presence of high voltage regarding the particular wires bearing the respective passive units.

35. A method of contactless detection of electromagnetic fields or electric voltages utilizing the system according to claim 32, the method comprising the steps of mounting each of said passive units at a spot where the electric field is to be detected, and activating the active unit to obtain indication of the electric field at each of said spots.

36. The method according to claim 35, for tracing malfunctions in an electric power line, including mounting a number of said passive units at a corresponding number of check points at the electric power line, passing along the electric power line using a vehicle with the portable active unit, and remotely providing measurements of the external electric field or voltage at the number of said check points.

37. A sensor for use in a device for non-contact detection of an external field by positioning the sensor at a spot where the external field is to be detected, the sensor comprising:

a delay line, which is to be exposed contactlessly to action of the external field, said delay being formed by a transducer arrangement that is provided on a substrate made of a material capable of transporting therethrough a wave sensitive to said external field, and that defines a wave channel for the wave propagation through the substrate, the transducer arrangement being capable of being actuated by an interrogation signal to generate said wave propagating through the wave channel and capable of converting the wave into an output response signal, said external field directly affecting a change in a velocity of the wave propagation, said output response signal being thereby informative of said external field; and an additional delay line formed by an additional transducer arrangement defining an additional wave channel, wherein said additional wave channel is screened from the external field, and has a propagation length different from that of the other wave channel, said output response signal being a vector sum of output signals of the two wave channels.

38. A sensor for use in a device for non-contact detection of an external field by positioning the sensor at a spot where the external field is to be detected, the sensor comprising:

a delay line, which is to be exposed contactlessly to action of the external field and is formed by a transducer arrangement that is provided on a substrate made of a material capable of transporting therethrough a wave sensitive to said external field, and defines a wave channel for the wave propagation through the substrate, the transducer arrangement being capable of being actuated by an interrogation signal to generate said wave propagating through the wave channel and capable of converting the wave into an output response signal, said external field affecting a change in a velocity of the wave propagation, said output response signal being thereby informative of said external field; and a field transformer operable to increase intensity of a field directly affecting the velocity of the wave propagation within the channel, as compared to the external field intensity, according to a known proportion, said field transformer being composed of two capacitors of different values of a capacity and a distance between the capacitor plates, such that the capacitor of a smaller capacity has a smaller distance between its plates, as compared to the other capacitor, the two capacitors being connected in parallel and being mounted at said spot where the external field is to be detected, the capacitor of the smaller capacity enclosing said delay line in a dielectric space between its place, the inner field of said capacitor of the smaller capacity affecting the velocity of the wave propagation through the channel.

39. A sensor for use in a device for non-contact detection of an external field by positioning the sensor at a spot where the external field is to be detected, the sensor comprising:

a delay line, which is to be exposed contactlessly to action of the external field and is formed by a transducer arrangement that is provided on a substrate made of a material capable of transporting therethrough a wave sensitive to said external field, and defines a wave channel for the wave propagation through the substrate, the transducer arrangement being capable of being actuated by an interrogation signal to generate said wave propagating through the wave channel and capable of converting the wave into an output response signal, said external field affecting a change in a velocity of the wave propagation, said output response signal being thereby informative of said external field; and a field transformer operable to increase intensity of a field directly affecting the velocity of the wave propagation within the channel, as compared to the external field intensity, according to a known proportion, said held transformer comprising a metal element having a part thereof formed with a sharp edge, the field transformer serving as a concentrator of the external field, which is to be detected, within the delay line, when said metal plate is located in said spot so as to extend predominantly along the external field, and said sharp edge is located in the close vicinity of the delay line.

* * * * *